(12) United States Patent
Dick et al.

(10) Patent No.: US 7,007,515 B2
(45) Date of Patent: Mar. 7, 2006

(54) NOBLE METAL DUCT FOR CONDUCTING A GLASS MELT AND METHOD FOR CONDUCTING A GLASS MELT

(75) Inventors: Erhard Dick, Pechbrunn (DE); Erich Fischer, Mitterteich (DE); Roland Fuchs, Mitterteich (DE); Markus Riedl, Mitterteich (DE)

(73) Assignee: Schott AG, Mainz (DE)

( * ) Notice: Subject to any disclaimer, the term of this patent is extended or adjusted under 35 U.S.C. 154(b) by 485 days.

(21) Appl. No.: 10/224,733

(22) Filed: Aug. 21, 2002

(65) Prior Publication Data

US 2003/0037572 A1 Feb. 27, 2003

(30) Foreign Application Priority Data

Aug. 24, 2001 (DE) ............... 101 41 585

(51) Int. Cl.
*C03B 5/42* (2006.01)
(52) U.S. Cl. .............. 65/346; 65/134.9; 65/135.1; 65/374.12
(58) Field of Classification Search .............. 65/134.9, 65/135.1, 346, 374.12
See application file for complete search history.

(56) References Cited

U.S. PATENT DOCUMENTS 3,206,295 A * 9/1965 Mattern ................ 65/178
3,429,684 A * 2/1969 Plumat ................ 65/335
3,771,988 A * 11/1973 Starr ................ 65/337
4,352,687 A 10/1982 Boettner
4,365,987 A * 12/1982 Boettner ................ 65/137
4,726,831 A * 2/1988 Fogle et al. ................ 65/135.6
5,900,036 A 5/1999 Mossadegh et al.
5,961,686 A * 10/1999 Chenoweth ................ 65/540
6,227,007 B1 5/2001 Palmquist
6,286,337 B1 * 9/2001 Palmquist ................ 65/157
6,629,437 B1 10/2003 Baucke et al.

FOREIGN PATENT DOCUMENTS

| DE | 195 08 536 A1 | 1/1996 |
| DE | 199 55 827 A1 | 6/2001 |
| EP | 0 173 355 A2 | 3/1986 |
| WO | 98/187731 | 5/1998 |

* cited by examiner

*Primary Examiner*—Sean Vincent
(74) *Attorney, Agent, or Firm*—Michael J. Striker

(57) ABSTRACT

The double-walled noble metal duct (1) for conducting a glass melt has an outer noble metal pipe (1b) and an inner noble metal pipe (1a) extending within the outer pipe, so that an inner space (21) is formed within the inner pipe and an intermediate space (23) is formed between the inner pipe (1a) and the outer pipe (1b). The intermediate space is completely filled with glass melt when the double-walled noble metal duct conducts the glass melt, when the outer pipe (1b) has an exhaust vent (4). The outer pipe (1b) also has a bottom outlet (7) communicating with the intermediate space for removal of oxygen bubbles formed on the outer wall. The noble metal duct can be used in glass conditioning and in the manufacture of glass articles that are devoid of polyvalent ions.

8 Claims, 1 Drawing Sheet

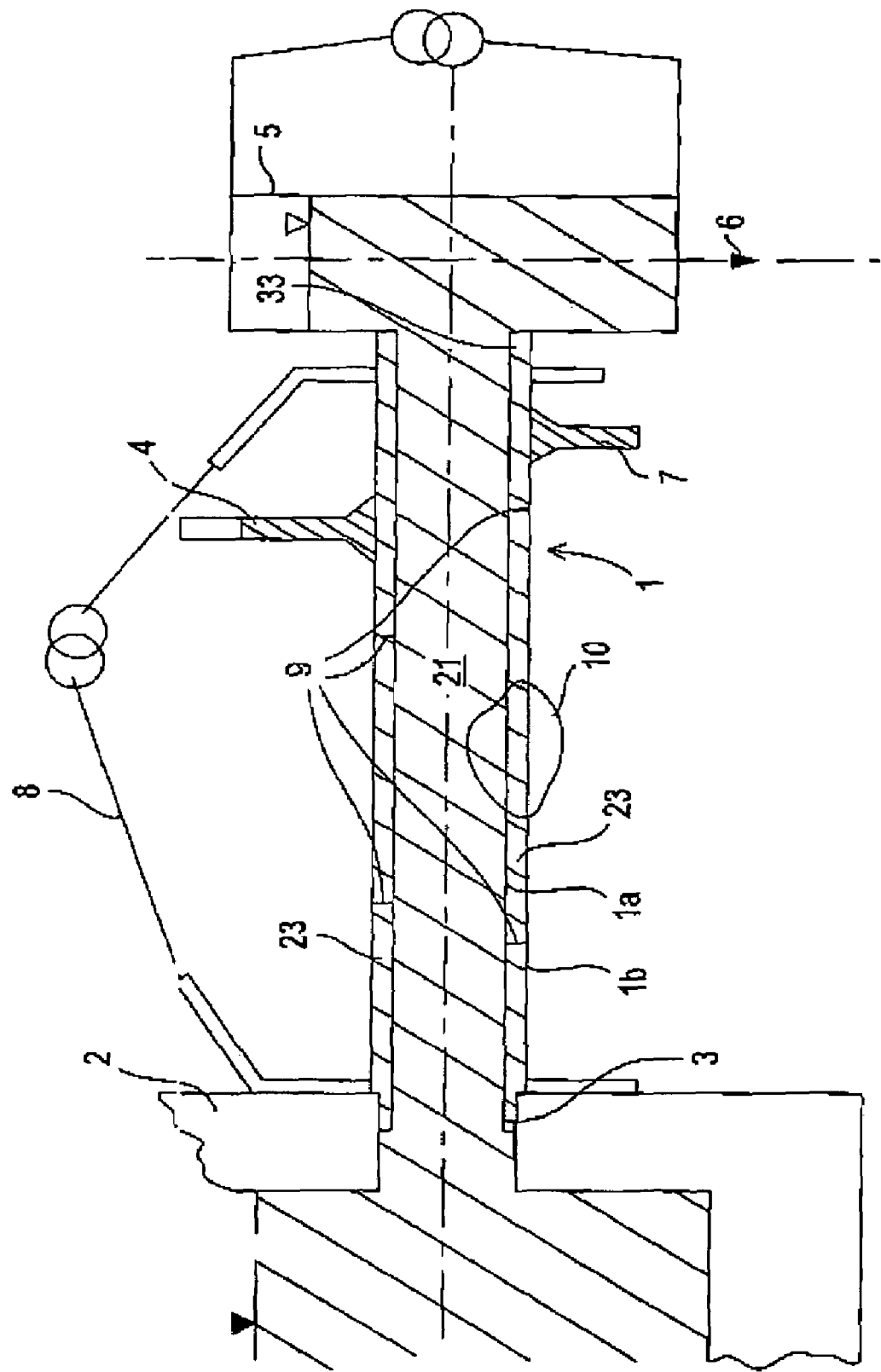

NOBLE METAL DUCT FOR CONDUCTING A GLASS MELT AND METHOD FOR CONDUCTING A GLASS MELT

BACKGROUND OF THE INVENTION

The present invention relates to a noble metal duct or conduit for conducting a glass melt and to a method for conducting a glass melt using the noble metal duct or conduit.

The dissociation of water, which is present in a glass melt, forms hydrogen and oxygen gas. The hydrogen gas will diffuse through a noble metal pipe or duct wall to the exterior, when the hydrogen partial pressure outside of the glass melt is less than that in the melt. A nonequilibrium condition thus arises in the interior space in the pipe or duct, because of the escape of the hydrogen from it. The product thus obtained has undesirable bubbles.

A method of avoiding the formation of oxygen bubbles in a glass melt during conduction of the glass melt is known and described in WO 98/18731. A hydrogen excess pressure is produced in that method on the side opposite to the glass-contacting side. The hydrogen overpressure applied from the outside minimizes the diffusion of hydrogen through the noble metal. Because of that equilibrium is maintained and the formation of gas bubbles is presented.

SUMMARY OF THE INVENTION

It is an object of the present invention to provide an apparatus and method for conducting and conditioning glass, in which gas bubble formation is minimized.

This object is attained, in part, by a double-walled noble metal duct for conducting a glass melt, which comprises an outer noble metal pipe and an inner noble metal pipe extending within the outer noble metal pipe, so that the noble metal duct has an inner space within the inner noble metal pipe and an intermediate space between the inner noble metal pipe and the outer noble metal pipe. The intermediate space between the inner and outer pipes of the double-walled noble metal duct is filled with a glass melt when the double-walled noble metal duct conducts a glass melt.

In preferred embodiments of the invention platinum or platinum alloy is used as the noble metal according to the invention.

The double-walled noble metal duct according to the invention has an exhaust vent and a bottom outlet both communicating with the intermediate space. Because of the exhaust vent it is possible to completely fill the intermediate space between the inner and outer walls of the noble metal duct. Oxygen formed on the outer pipe can be drawn off through the bottom outlet.

The above object is also attained, in part, by a method for guiding a glass melt through a duct system comprising the double-walled noble metal duct, so that the glass melt is free of oxygen bubbles. The noble metal duct is a double-walled pipe having an inner wall and an outer wall both made of the noble metal, so that an inner space is formed within the inner wall and an intermediate space is formed between the outer wall and the inner wall. The intermediate space between the inner wall and the outer wall is filled with glass melt when glass melt is conducted through the double-walled noble metal duct, as explained above.

The invention also comprises a method of guiding and conditioning a glass melt, including conducting the glass melt through a double-walled noble metal duct or pipe.

In addition, the invention further comprises a method of preparation of glass articles devoid of polyvalent ions.

BRIEF DESCRIPTION OF THE SOLE FIGURE

The objects, features and advantages of the invention will now be illustrated in more detail with the aid of the following description of the preferred embodiments, with reference to the accompanying sole FIGURE showing an example of the double-walled noble metal duct for conducting a glass melt according to the invention.

DETAILED DESCRIPTION OF THE INVENTION

A duct system is shown in the sole FIGURE, which comprises a noble metal double-walled duct 1. The double-walled noble metal duct 1 comprises an outer noble metal pipe 1b and an inner noble metal pipe 1a extending within the outer noble metal pipe 1b. In this embodiment the inner noble metal pipe 1a and the outer noble metal pipe 1a consist of platinum metal.

In the embodiment shown in the sole FIGURE the glass melt flows from a distributor or working pan through a flow stone or melt outlet member 2 into the double-walled noble metal duct 1. The inner space 21 in the noble metal duct 1 and the intermediate space 23 between the inner noble metal pipe 1a and the outer noble metal wall 1b are filled with the glass melt when the duct 1 conducts a glass melt. The glass melt flows into the upstream entrance or beginning 3 of the intermediate space 23 into the intermediate space; the opposite or downstream end 33 of the intermediate space 23 is advantageously closed. Since the horizontal portion of the duct 1 has an exhaust vent 4 communicating with the intermediate space, the complete access to the intermediate space 23 is guaranteed. The glass melt flows unhindered to the target or destination vessel 5 through the inner space 21 of the double-walled noble metal duct 1, since the glass melt flows out through the glass outlet 6. Oxygen bubbles, which form on the outer noble metal wall 1b, for example at position 10, can be removed by means of a bottom outlet 7 communicating with the intermediate space. The entire double-walled noble metal duct 1 is heated by means of an electrical heating circuit 8. The interior and outer noble metal pipes 1a, 1b are connected by connecting pieces or cross members 9.

The nonequilibrium reaction according to equation I takes place when different hydrogen partial pressures are present on respective sides of the noble metal duct 1. Platinum is known to be permeable to hydrogen. When the hydrogen partial pressure outside of the melt is less than that in the melt, the hydrogen diffuses through the platinum walls of the pipe. Nonequilibrium according to equation I arises in the melt. This nonequilibrium leads to formation of oxygen bubbles in the melt. The product so obtained has undesirable bubbles.

According to the invention the equilibrium reaction according to formula II takes place in the inner space of the double-walled noble metal duct 1. The glass between the noble metal pipes 1a, 1b prevents the diffusion of the hydrogen through the inner noble metal wall 1a. The equilibrium remains present during water dissociation, since equal hydrogen partial pressures exist on both sides of the noble metal inner wall 1a. Thus no oxygen bubbles form.

The equations I and II are:

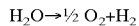

$$H_2O \rightarrow \tfrac{1}{2} O_2 + H_2 \qquad \text{I}$$

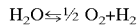

$$H_2O \leftrightharpoons \tfrac{1}{2} O_2 + H_2 \qquad \text{II.}$$

The disclosure in German Patent Application 101 41 585.0-45 filed on Aug. 24, 2001 in Germany is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a double-walled noble melt duct or pipe for conducting a glass melt, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A double-walled noble metal duct for conducting a glass melt, said double-walled noble metal duct comprising an outer noble metal pipe and an inner noble metal pipe extending within the outer noble metal pipe, so that an inner space is formed within the inner noble metal pipe, an intermediate space is formed between the inner noble metal pipe and the outer noble metal pipe, and said intermediate space is filled with glass melt when the glass melt is conducted through the inner space,
   wherein said intermediate space has an upstream entrance through which said glass melt enters said intermediate space, but said intermediate space is closed at a downstream end thereof.

2. The double-walled noble metal duct as defined in claim 1, further comprising an exhaust vent communicating with said intermediate space, so that said intermediate space completely fills with the glass melt during conduction of the glass melt.

3. The double-walled noble metal pipe as defined in claim 1, further comprising a bottom outlet communicating with said intermediate space for removal of oxygen bubbles formed on the outer noble metal pipe.

4. The double-walled noble metal duct as defined in claim 1, wherein said outer noble metal pipe and said inner noble metal pipe are both made of platinum metal or platinum alloy.

5. A double-walled noble metal duct for conducting a glass melt, said double-walled noble metal duct comprising an outer noble metal pipe and an inner noble metal pipe extending within the noble metal outer pipe, so that an inner space is formed within the inner pipe and an intermediate space is formed between the inner noble metal pipe and the outer noble metal pipe, said intermediate space having an entrance at an upstream end thereof and being closed at a downstream end thereof;
   wherein said outer noble metal pipe has an exhaust vent communicating with said intermediate space so that said intermediate space completely fills with said glass melt when said glass melt is conducted through the inner space and a bottom outlet communicating with said intermediate space, whereby oxygen bubbles formed on said outer noble metal wall are removed.

6. A method of guiding and conditioning a glass melt, said method comprising the steps of:
   a) providing a double-walled noble metal duct, wherein said double-walled noble metal duct comprises an outer noble metal pipe and an inner noble metal pipe extending within the outer noble metal pipe, so that an inner space is formed within the inner noble metal pipe and an intermediate space is formed between the inner noble metal pipe and the outer noble metal pipe, said intermediate space having an upstream entrance for said glass melt, wherein said intermediate space has an upstream entrance through which said glass melt enters said intermediate space, but said intermediate space is closed at a downstream end thereof;
   b) conducting said glass melt through said inner space of said double-walled noble metal duct into the upstream entrance of the intermediate space so that said intermediate space fills with said glass melt; and
   c) removing bubbles formed on said outer noble metal pipe during the conducting of said glass melt through said inner space.

7. The method as defined in claim 6, wherein said outer noble metal pipe and said inner noble metal pipe are both made of platinum metal or platinum alloy.

8. A method of producing a glass article devoid of polyvalent ions, said method comprising the steps of:
   a) providing a double-walled noble metal duct, wherein said double-walled noble metal duct comprises an outer noble metal pipe and an inner noble metal pipe extending within the outer noble metal pipe, so that an inner space is formed within the inner noble metal pipe and an intermediate space is formed between the inner noble metai pipe and the outer noble metal pipe, said intermediate space having an upstream entrance for said glass melt, wherein said intermediate space has an upstream entrance through which said glass melt enters said intermediate space, but said intermediate space is closed at a downstream end thereof;
   b) conducting said glass melt through said inner space of said double-walled noble metal duct to a glass outlet and into the upstream entrance of the intermediate space s that said intermediate space fills with said glass melt; and
   c) removing bubbles formed on said outer noble metal pipe from an intermediate space outlet during the conducting of said glass melt through said inner space and through the glass outlet; and
   d) making the glass article from the glass melt flowing out through the glass outlet.

* * * * *